C. H. Raymond,
Making Sheet-Metal Vessels.
No. 3,271. Reissued Jan. 19, 1869.
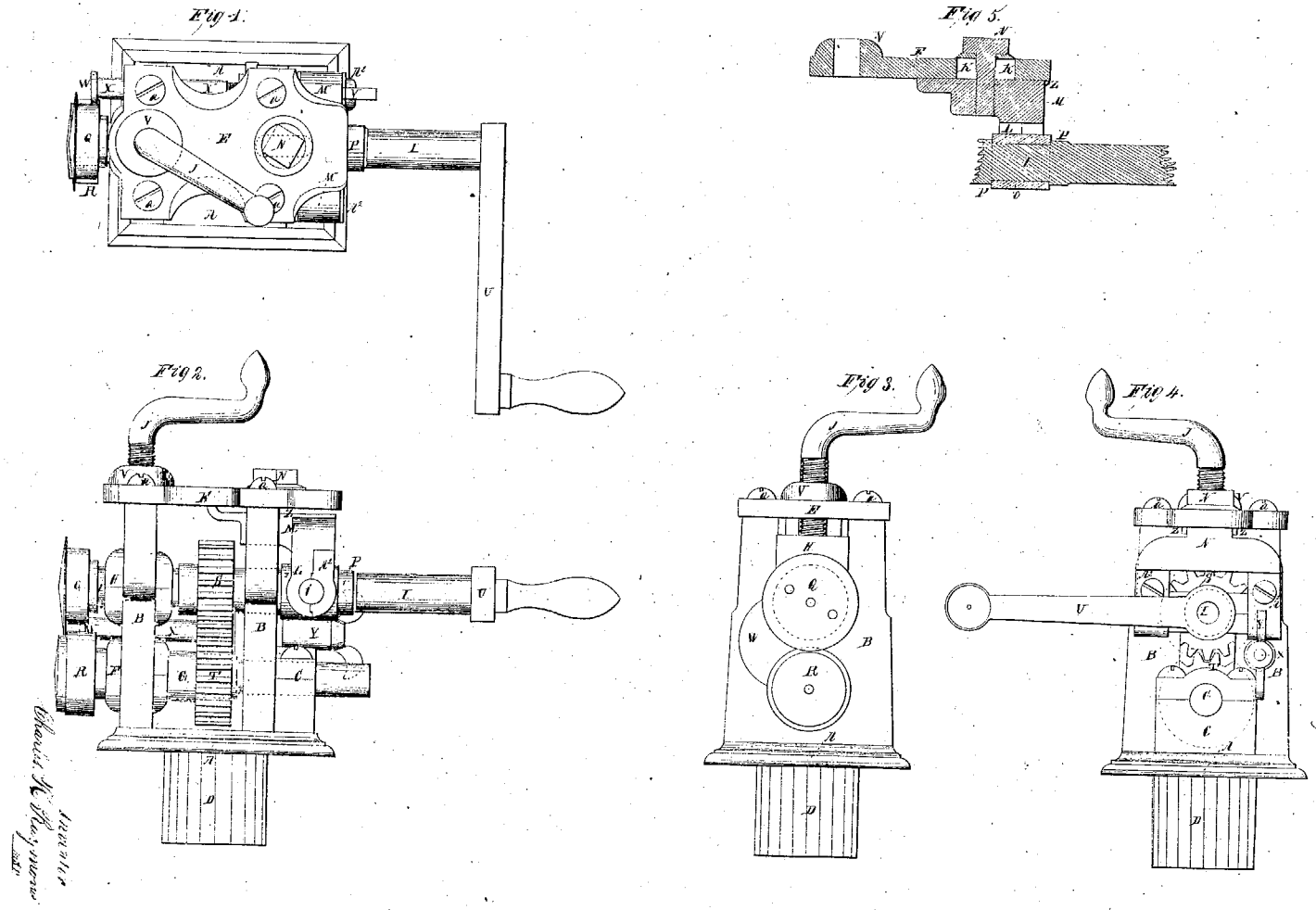
Witnesses.
R. W. Scott
H. B. Smith
Inventor
Charles H. Raymond
per
N. PETERS, PHOTO-LITHOGRAPHER, WASHINGTON, D. C.

UNITED STATES PATENT OFFICE.

CHARLES H. RAYMOND, OF SOUTHINGTON, CONNECTICUT.

IMPROVEMENT IN TINMEN'S MACHINES.

Specification forming part of Letters Patent No. 25,278, dated August 30, 1859; Reissue No. 3,271, dated January 19, 1869.

*To all whom it may concern:*

Be it known that I, CHARLES H. RAYMOND, of Southington, in the county of Hartford and State of Connecticut, have invented and made a certain new and useful Improvement in Tinmen's Machines; and I do hereby declare the following to be a full, clear, and exact description of the said invention, reference being had to the annexed drawings, making part of this specification, wherein—

Figure 1 is a plan of said machine. Fig. 2 is an elevation of the same. Fig. 3 is a front elevation showing the rolls. Fig. 4 is a rear elevation at the end of the shaft to which the crank is applied, and Fig. 5 is a section through the rear bearing for the shaft of the upper roller.

Similar marks of reference denote the same parts.

In the construction of tinmen's machines a difficulty has heretofore existed in adjusting the upper shaft so that the ribs or grooves of one roller come in the correct position to those on the other. This adjustment, before my present invention, had been effected by turning off the shoulders of the upper shaft, or introducing washers. These devices were inconvenient, unreliable, and did not allow the shaft to be adjusted to the different rolls that might be employed in the machine. This difficulty of adjustment has been increased in consequence of the upper shaft having to be mounted, so that the same can be slightly elevated at one end to open the rollers for entering or acting upon the material.

My invention is intended to overcome these difficulties; and it consists in an adjustable and swinging bearing applied to the upper shaft of the tinman's machine, so that the said shaft may be adjusted endwise with facility for regulating the relative position of the rolls.

In the drawings, A is the base of the machine; B B, the side frames; D, a projection below the base A, by means of which the machine may be supported, connected, or attached to a bench or other suitable place. C is the box at one end, and F the box near the other end, of the shaft G, that carries the lower roller, R. T is a gear-wheel on G, gearing to the wheel S on the upper shaft, I, that carries at its end the upper roller, Q. These parts may be of any usual or desired character. The box H of the shaft I is acted upon by a screw, J, so that it can be raised or lowered, as required, for bringing the roller Q to its work. The other journal-pox, L, with its cap O, sustaining the shaft I, is formed with trunnions *i*, entering the bearings $A^2$ on the adjustable block M, that is represented as setting against the under side of the cap-plate E between the ribs *z z*, so that this bearing and journal-box can be adjusted to move the shaft I endwise.

In Fig. 5 it will be seen that the shoulders P P on the shaft I, taking upon opposite sides of the box L, cause the box to keep the shaft in the position endwise to which it may be adjusted.

I have represented the plate E as attached to the frames B B by screws *a*, and a hub or boss, V, for the screw J to pass through, and a screw, N, through the slot K, for holding the block M in whatever position it may be moved to; but I do not limit myself to this construction of devices.

The gage W on the shaft X is mounted and made adjustable in any usual manner.

It will be evident that by providing an endwise adjustment to the upper shaft, in addition to the swinging journal-box, the rolls can be brought to the proper position with the greatest accuracy, and there held while employed upon the sheet metal. This endwise adjustment of the shaft I may be applied to any tinman's tools in which rollers are employed, and provides a means for setting the rolls when the machine is being manufactured, and also in case of the rolls becoming worn.

What I claim, and desire to secure by Letters Patent is—

An endwise adjustment applied to the shaft that is fitted to swing in the bearings, substantially as set forth.

Dated August 25, A. D. 1868.

C. H. RAYMOND.

Witnesses:

H. A. JONES,

H. R. BRADLEY.